United States Patent
Van Aert et al.

(10) Patent No.: US 8,921,265 B2
(45) Date of Patent: Dec. 30, 2014

(54) COLOUR LASER MARKING METHODS OF SECURITY DOCUMENTS

(75) Inventors: Hubertus Van Aert, Pulderbos (BE); Ingrid Geuens, Emblem (BE); Paul Callant, Edegem (BE); Bart Waumans, Puurs (BE)

(73) Assignee: Agfa-Gevaert N.V., Mortsel (BE)

( * ) Notice: Subject to any disclaimer, the term of this patent is extended or adjusted under 35 U.S.C. 154(b) by 0 days.

(21) Appl. No.: 13/885,765

(22) PCT Filed: Dec. 6, 2011

(86) PCT No.: PCT/EP2011/071836
§ 371 (c)(1),
(2), (4) Date: May 16, 2013

(87) PCT Pub. No.: WO2012/076488
PCT Pub. Date: Jun. 14, 2012

(65) Prior Publication Data
US 2013/0229008 A1    Sep. 5, 2013

Related U.S. Application Data

(60) Provisional application No. 61/425,771, filed on Dec. 22, 2010.

(30) Foreign Application Priority Data

Dec. 7, 2010  (EP) .................................... 10193896

(51) Int. Cl.

| | |
|---|---|
| *B41M 3/14* | (2006.01) |
| *B41M 5/26* | (2006.01) |
| *B41M 5/337* | (2006.01) |
| *B41M 5/41* | (2006.01) |
| *B41M 5/44* | (2006.01) |
| *B42D 15/00* | (2006.01) |
| *C09B 23/01* | (2006.01) |
| *C09B 23/08* | (2006.01) |
| *B41M 5/323* | (2006.01) |
| *B41M 5/327* | (2006.01) |
| *B41M 5/333* | (2006.01) |

(52) U.S. Cl.
CPC ................ *B42D 15/00* (2013.01); *B41M 5/41* (2013.01); *B41M 5/44* (2013.01); *B41M 5/3372* (2013.01); *B41M 5/267* (2013.01); *B42D 15/0013* (2013.01); *B41M 3/142* (2013.01); *B41M 5/323* (2013.01); *B41M 5/327* (2013.01); *B41M 5/3336* (2013.01); *B41M 2205/04* (2013.01); *C09B 23/0008* (2013.01); *C09B 23/0066* (2013.01); *C09B 23/086* (2013.01); *Y10S 430/146* (2013.01)
USPC ............ 503/214; 283/95; 283/109; 430/200; 430/945; 503/200

(58) Field of Classification Search
CPC .... B41M 3/142; B41M 5/267; B41M 5/3372; B41M 5/41; B41M 5/44; B42D 15/0013; B42D 15/10; B41J 2/442
USPC .................. 503/200, 214, 226; 430/200, 945; 283/95, 109
See application file for complete search history.

(56) References Cited

U.S. PATENT DOCUMENTS

| | | |
|---|---|---|
| 3,649,336 A | 3/1972 | Van Paesschen et al. |
| 4,663,518 A | 5/1987 | Borror et al. |
| 4,720,449 A | 1/1988 | Borror et al. |
| 5,200,947 A | 4/1993 | Satake et al. |
| 5,243,052 A | 9/1993 | Taylor et al. |
| 5,410,335 A | 4/1995 | Sawano et al. |
| 6,017,972 A | 1/2000 | Harris et al. |
| 6,100,009 A | 8/2000 | Obayashi et al. |
| 7,097,899 B2 | 8/2006 | Daems et al. |
| 7,158,145 B1 | 1/2007 | Fannasch et al. |
| 7,980,596 B2 | 7/2011 | Labrec |
| 2001/0044553 A1 | 11/2001 | Kabashima et al. |
| 2003/0183695 A1 | 10/2003 | Labrec et al. |
| 2005/0001419 A1 | 1/2005 | Levy et al. |
| 2006/0276335 A1 | 12/2006 | Tsuboi et al. |
| 2008/0076065 A1 | 3/2008 | Bennett et al. |
| 2008/0224462 A1 | 9/2008 | Dubner et al. |
| 2008/0238086 A1 | 10/2008 | Geuens et al. |
| 2010/0099556 A1 | 4/2010 | Vetterling et al. |

FOREIGN PATENT DOCUMENTS

| | | |
|---|---|---|
| EP | 0174054 A2 | 3/1986 |
| EP | 0605149 A2 | 7/1994 |
| EP | 0 739 748 | 10/1996 |

(Continued)

OTHER PUBLICATIONS

International Preliminary Report on Patentability in corresponding International Patent Application No. PCT/EP2011/071836, mailed Jun. 12, 2013.

International Search Report in corresponding International Patent Application No. PCT/EP2011/071836, mailed Jan. 5, 2012.

*Primary Examiner* — Bruce H Hess

(74) *Attorney, Agent, or Firm* — Leydig, Voit & Mayer, Ltd.

(57) ABSTRACT

A security document precursor including, in order: a) at least one transparent biaxially stretched polyester foil; b) one colorless color forming layer containing at least an infrared absorber, a colorless dye-precursor and a polymeric binder; and c) a polymeric support; wherein the polymeric binder is copolymer including at least 90 wt % of a chlorinated ethylene and 1 wt % to 10 wt % of vinyl acetate both based on the total weight of the binder. Methods for making the security document precursor are also disclosed.

16 Claims, No Drawings

(56) References Cited

FOREIGN PATENT DOCUMENTS

| | | |
|---|---|---|
| EP | 1452334 A2 | 9/2004 |
| EP | 2 181 858 A1 | 5/2010 |
| EP | 2 199 100 A1 | 6/2010 |
| GB | 811066 | 3/1959 |
| GB | 1441591 | 7/1976 |
| JP | 61175077 A | 8/1986 |
| WO | WO 2005/025885 A1 | 3/2005 |
| WO | WO 2009/140083 A2 | 11/2009 |
| WO | WO 2012/076406 A1 | 6/2012 |
| WO | WO 2012/076493 A1 | 6/2012 |
| WO | WO 2012/076354 A1 | 9/2012 |

COLOUR LASER MARKING METHODS OF SECURITY DOCUMENTS

CROSS-REFERENCE TO RELATED APPLICATIONS

The present application is the U.S. National Phase of PCT/EP2011/071836, filed Dec. 6, 2011, claiming the benefit of European Patent Application No. 10193896.7, filed Dec. 7, 2010, and U.S. Provisional Patent Application No. 61/425,771, filed Dec. 22, 2010; the disclosures of the '836, '896 and '771 applications are incorporated by reference.

TECHNICAL FIELD

This invention relates to methods for colour laser marking security document precursors and to the resulting laser marked security documents.

BACKGROUND ART

Security cards are widely used for various applications such as identification purposes (ID cards) and financial transfers (credit cards). Such cards typically consist of a laminated structure consisting of various paper or plastic laminates and layers wherein some of them may carry alphanumeric data and a picture of the card holder. So called 'smart cards' can also store digital information by including an electronic chip in the card body.

A principal objective of such security cards is that they cannot be easily modified or reproduced in such a way that the modification or reproduction is difficult to distinguish from the original.

Two techniques frequently used for preparing security documents are laser marking and laser engraving. In literature, laser engraving is often incorrectly used for laser marking. In laser marking, a colour change is observed by local heating of material, while in laser engraving material is removed by laser ablation.

US 2005001419 (DIGIMARK) discloses a colour laser engraving method and a security document including an opaque surface layer and one or more coloured sub-layers. A laser provides openings in the surface layer to expose the colour of the sub-layer thereby creating colour images and text.

WO 2009/140083 (3M) discloses methods to generate a colour image in a multilayer article containing at least one thermally activatable layer coated from a composition including a non-linear light to heat converter, a leuco dye, a thermal acid generator and a solvent. A colour image is formed in the colour forming layer upon activation with non-linear light beam radiation (300-1500 nm).

U.S. Pat. No. 7,158,145 (ORGA SYSTEMS) discloses a three-wavelength system (440, 532 and 660 nm) for applying coloured information to a document by means of wavelength-selective bleaching of chromophoric particles in a layer close to the surface.

U.S. Pat. No. 4,720,449 (POLAROID) discloses a thermal imaging method for producing colour images on a support carrying at least one layer of a colourless compound, such as di- or triarylmethane, by direct application of heat or by conversion of electromagnetic radiation into heat. The laser beam may have different wavelengths, typically in a range above 700 nm with at least about 60 nm apart so that each imaging layer may be exposed separately to convert a colourless triarylmethane compound into a coloured form, such as yellow, magenta, cyan or black, by controlling the focusing depth of the laser beam source to each colour forming layer. The colour forming compositions include di- or triarylmethane compounds, infrared absorbers, acidic substances and binders.

U.S. Pat. No. 4,663,518 (POLAROID) discloses a laser printing method for activating heat sensitive image forming dyes in three different layers on a support to card holder, coloured text and machine readable digital code.

Suitable binders that may be used in U.S. Pat. No. 4,720,449 (POLAROID) and U.S. Pat. No. 4,663,518 (POLAROID) include polyvinyl alcohol, polyvinyl pyrrolidone, methyl cellulose, cellulose acetate butyrate, copolymers of styrene and butadiene, polymethyl methacrylate, copolymers of methyl and ethyl acrylate, polyvinyl acetate, polyvinyl chloride and polyvinyl butyral. These binders are commonly employed in heat sensitive recording elements because of their inertness, i.e. they do not have any adverse effect on the colour formation reaction. However, adhesion problems have frequently been observed with these binders. Adhesion is an important aspect for security documents since poor adhesion allows delamination and thus falsification of the laser marked image inside the security document.

Therefore, it would be desirable to have a secure colour laser marking system for producing security documents which combines good adhesion and good image quality.

SUMMARY OF INVENTION

In order to overcome the problems described above, preferred embodiments of the present invention provide a security document precursor as described herein.

It is a further object of the present invention to provide a method for manufacturing the security document precursors having a good image quality and which are more difficult to falsify.

Further advantages and embodiments of the present invention will become apparent from the following description.

DEFINITIONS

The term "graphical data" as used in disclosing the present invention means any graphical representation, e.g. a picture of a person, a drawing, etc.

The term "information" as used in disclosing the present invention means any alphanumeric data, e.g. name, place of birth, date of birth, etc.

The term "image" as used in disclosing the present invention means any graphical data and information. The image on a security document preferably varies at least partially from one security document to another one.

The term "security document" as used in disclosing the present invention means a document which contains the required image, e.g. a valid passport or identification card, and is ready for use.

The term "security document precursor" as used in disclosing the present invention means a document not containing all the required components of the security document, e.g. a layer or a security feature, and/or not containing the required image of the security document.

The term "visible spectrum" as used in disclosing the present invention means the electromagnetic spectrum from 400 nm to 700 nm.

The term "polymeric foil" as used in disclosing the present invention, means a self-supporting polymer-based sheet, which may be associated with one or more adhesion layers e.g. subbing layers. Foils are generally manufactured through extrusion.

The term "support" as used in disclosing the present invention, means a self-supporting polymer-based sheet, which may be transparent but is preferably opaque and which may be associated with one or more adhesion layers e.g. subbing layers. Supports are generally manufactured through extrusion.

The term "layer", as used in disclosing the present invention, is considered not to be self-supporting and is manufactured by coating it on a support or a polymeric foil.

"PET" is an abbreviation for polyethylene terephthalate.

"PETG" is an abbreviation for polyethylene terephthalate glycol, the glycol indicating glycol modifiers which are incorporated to minimize brittleness and premature aging that occur if unmodified amorphous polyethylene terephthalate (APET) is used in the production of cards.

"PET-C" is an abbreviation for crystalline PET, i.e. a biaxially stretched polyethylene terephthalate. Such a polyethylene terephthalate support or foil has excellent properties of dimensional stability.

The definitions of security features correspond with the normal definition as adhered to in the "Glossary of Security Documents—Security features and other related technical terms" as published by the Consilium of the Council of the European Union on Aug. 25, 2008 (Version: v.10329.02.b.en) on its website: http://www.consilium.europa.eu/prado/EN/glossaryPopup.html.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term "substituted" in, for example substituted alkyl, means that the substituent on alkyl contains at least one atom different from carbon or hydrogen. The substituent may be a single atom (e.g. a halogen) or a group of atoms containing at least one atom different from carbon or hydrogen (e.g. an acrylate group).

The term "chlorinated ethylene", as used in disclosing the present invention, means ethylene substituted with at least one chlorine atom e.g. vinyl chloride, vinylidene chloride, 1,2-dichloro-ethylene, trichloroethylene and tetrachloroethylene. Trichloroethylene and tetrachloroethylene are all much more difficult to polymerize than vinyl chloride or vinylidene chloride.

A leuco dye is a well-known colour forming compound whose molecules can acquire two forms, one of which is colourless. An example of a leuco dye is crystal violet lactone, which in its lactone form is colourless, but when it is protonated becomes intensely violet.

Security Documents and Precursors

The security document precursor according to the present invention has at least one colourless colour forming layer including at least:
a) an infrared absorber;
b) a colourless dye-precursor; and
c) a polymeric binder;
wherein the polymeric binder is a copolymer including at least 90 wt % of a chlorinated ethylene and 1 wt % to 10 wt % of vinyl acetate both based on the total weight of the binder.

The security document precursor may further include d) a thermal acid generating compound.

The colourless colour forming layer(s) can be coated onto the polyester foil by any conventional coating technique, such as dip coating, knife coating, extrusion coating, spin coating, slide hopper coating and curtain coating. Preferably the colourless colour forming layer is coated with a slide hopper coater or a curtain coater, more preferably coated onto the transparent polymeric foil including a subbing layer.

The dry thickness of the colourless colour forming layer is preferably between 5 and 40 $g/m^2$, more preferably between 7 and 25 $g/m^2$, and most preferably between 10 and 15 $g/m^2$.

The security document precursor according to present invention contains at least one colourless colour forming layer, but preferably contains two, three or more colourless colour forming layers containing different infrared absorbers and colour forming compounds for producing a multi-coloured security document.

The infrared absorber not only delivers the heat for the colour forming action, but also has the advantage that there is no or minimal absorption in the visible spectrum and thus also no or minimal interference with the colours formed by the one or more colourless colour forming layers. This also allows having, for example, a pure white background in a security document.

The security document precursor preferably contains colourless colour forming layers for forming a cyan, a magenta and a yellow image or for forming a red, a blue and a green image, since most colour management systems for producing colour images are based on either a CMY or RGB colour reproduction.

Colour Laser Marking

The security document precursor is laser marked using one or more infrared lasers. The colourless colour forming layer includes an infrared absorber which is capable of converting the infrared radiation of the infrared laser into heat which triggers the colour formation reaction. Hence, the laser emission wavelength of the infrared laser preferably matches the absorption maximum of the infrared dye within 40 nm, more preferably within 25 nm.

The infrared laser used in the method of colour laser marking a security document precursor is preferably an optically pumped semiconductor laser or a solid state Q-switched laser.

A semiconductor laser is particularly preferred because the device is compact and inexpensive. Most semiconductor lasers are laser diodes, which are pumped with an electrical current in a region where n-doped and p-doped semiconductor material meet. However, there are also optically pumped semiconductor lasers, where carriers are generated by absorbed pump light. Optically pumped semiconductor lasers have the advantage of unique wavelength flexibility, different from any other solid-state based laser. The fundamental near-IR output wavelength is determined by the structure of the gain chip (e.g. the semiconductor InGaAs), and can be set anywhere between about 920 nm and about 1150 nm. This allows a perfect match between the laser emission wavelength and the infrared dye absorption maximum.

The infrared laser is most preferably a solid state Q-switched laser. Q-switching is a technique by which a laser can be made to produce a pulsed output beam. The technique allows the production of light pulses with extremely high peak power, much higher than would be produced by the same laser if it were operating in a continuous wave (constant output) mode, Q-switching leads to much lower pulse repetition rates, much higher pulse energies, and much longer pulse durations.

Infrared lasers are widely commercially available. An example of a solid state Q-switched laser is the Matrix™ 1064 laser from COHERENT emitting at 1064 nm and capable of producing an average power of 7 Watt at a pulse repetition rate of 10 kHz.

Colourless Dye-Precursors

Colourless dye-precursors are colourless or slightly yellowish compounds which react into a coloured form.

The colourless dye-precursor is preferably present in the colourless colour forming layer in an amount of 0.5 to 5.0 g/m$^2$, more preferably in an amount of 1.0 to 3.0 g/m$^2$.

For performing the method of colour laser marking according to the present invention, the following reaction mechanisms and colour forming compounds involved are suitable to form a coloured dye.

1. Fragmentation of a Colourless Dye-Precursor

The reaction mechanism can be represented by:

Colourless dye-FG→Dye wherein FG represents a fragmenting group.

Such a reaction mechanism is explained in more detail by U.S. Pat. No. 5,243,052 (POLAROID) disclosing the colour formation by fragmentation of a mixed carbonate ester of a quinophthalone dye and a tertiary alkanol containing not more than about 9 carbon atoms.

The fragmentation of a colourless dye-precursor may be catalyzed or amplified by acid generating agents. The dyes G-(18) to G-(36) disclosed by U.S. Pat. No. 6,100,009 (FUJI) are catalyzed or amplified by polymeric acid generating agents based on A-(1) to A-(52), which are also suitable as acid generating agents in the present invention.

Another preferred colourless dye-precursor is the leuco dye-precursor (CASRN104434-37-9) shown in EP 174054 A (POLAROID) which discloses a thermal imaging method for forming colour images by the irreversible unimolecular fragmentation of one or more thermally unstable carbamate moieties of an organic compound to give a visually discernible colour shift from colourless to coloured.

The fragmentation of a leuco dye-precursor may be a two-step reaction mechanism represented by:

Leuco-dye-FG→[Leuco-dye]→Coloured Dye wherein FG represents a fragmenting group.

The fragmentation of the colourless leuco dye-precursor may be catalyzed or amplified by acids and acid generating agents. The leuco dye-precursors G-(1) to G-(17) disclosed by U.S. Pat. No. 6,100,009 (FUJI) are catalyzed or amplified by polymeric acid generating agents based on A-(1) to A-(52), which are also suitable as acid generating agents in the present invention.

2. Protonation of a Leuco Dye after Fragmentation of a H-Donor-Precursor

The reaction mechanism can be represented by:

Leuco-dye+H-donor-FG→Leuco-dye+H-donor→Coloured Dye wherein FG represents a fragmenting group.

A preferred H-donor-FG compound includes an ester group as part of its chemical structure (the rest of the compound is represented by the group T) which by laser heating forms a carboxylic acid group:

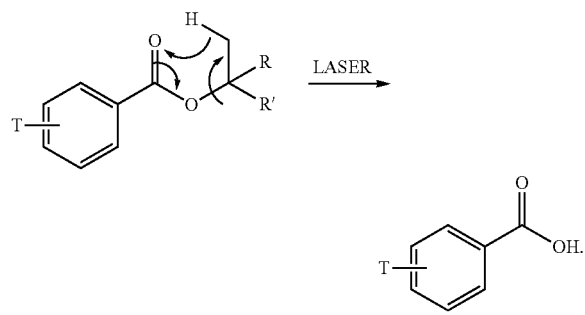

A more preferred H-donor-precursor includes a carbonate group, e.g. a tBOC group, as part of its chemical structure (the rest of the compound is represented by the group T) which by laser heating forms a phenol group:

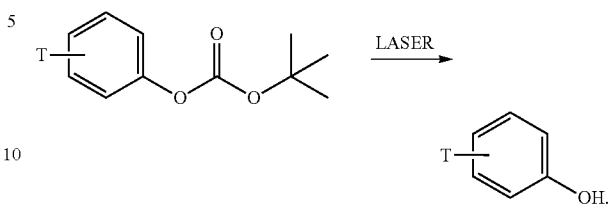

Preferred carbonate groups are given on page 8 of EP 605149 A (JUJO PAPER). In a preferred embodiment, the H-donor-FG compound contains 2 carbonate groups.

The most preferred H-donor-FG compound is:

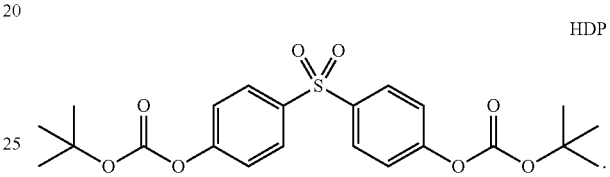

The synthesis of compound HDP (CASRN 129104-70-7) is given on page 31 of EP 605149 A (JUJO PAPER) for the compound (19).

In addition to the H-donor, the fragmentation of the H-donor-FG compound above also leads to the formation of a compound having a melting temperature lower than room temperature (20° C.). In the present invention the formation of such a compound is used as an additional security feature. After producing a security document by the method of colour laser marking according to the present invention wherein a biaxially stretched polyester foil is used as overlay, the compound having a melting temperature lower than room temperature will disturb a second laser marking (falsification of the security document) by the formation of visible blisters in laser marked areas.

3. Protonation of a Leuco Dye after a Re-Arrangement in a H-Donor-Precursor

The reaction mechanism can be represented by:

Leuco-dye+H-donor-RG→Leuco-dye+H-donor→Coloured Dye wherein RG represents a rearranging group.

A preferred H-donor-RG compound is capable of forming a compound having an allyl substituted phenol group as part of its chemical structure (the rest of the compound is represented by the group T) by laser heating:

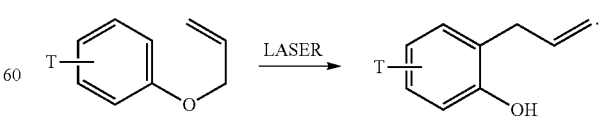

Preferred H-donor-RG compounds include 4-hydroxy-4'-allyloxy diphenylsulfone and 4,4'-diallyloxy diphenylsulfone whereof the synthesis is disclosed by EP 1452334 A (RICOH).

In contrast to the H-donor-FG compound of reaction mechanism 2, no compound having a melting temperature lower than room temperature (20° C.) is produced by the rearrangement of the H-donor-precursor to a hydrogen donor. Consequently, the security feature of blister formation as possible with the H-donor-FG compound cannot be produced by the H-donor-RG compounds.

The colour formation according to the mechanisms 2 and 3 above are two-component reactions involving a colourless leuco dye and a hydrogen donor-precursor, i.e. a 'H-donor-FG compound' or 'H-donor-RG compound', while the first reaction mechanism is an one-component reactions. The advantage of using a two-component reaction for the colour formation is that the stability, especially the shelf-life stability, can be enhanced. The probability of undesired colour formation due to environment heating is decreased by going from a single step reaction to a two step reaction involving the formation of the H-donor followed by a reaction of the formed H-donor with the leuco dye.

The preferred colour formation mechanism is the protonation of a leuco dye after fragmentation of the H-donor-precursor since it includes both advantages of the blister formation security feature and the enhanced shelf-life stability.

In a preferred embodiment of the colourless colour forming layer, a combination is used of 4,4'-Bis(tert-butoxycarbonyloxy)diphenylsulfone (CASRN 129104-70-7) as the H-donor-FG compound with the colourless leuco dye crystal violet lactone (CASRN 1552-42-7).

Infrared Absorbers

The infrared absorber used in the colourless colour forming layer of the security document precursor according to the present invention, can be an infrared dye, an infrared organic pigment and an inorganic infrared pigment, but preferably the infrared absorber is an infrared dye.

The advantage of using infrared dyes is that the absorption spectrum of an infrared dye tends to be narrower than that of an infrared pigment. This allows the production of multicoloured articles and security documents from precursors having a plurality of colourless colour forming layers containing different infrared dyes and colour forming compounds. The infrared dyes having a different $\lambda_{max}$ can then be addressed by infrared lasers with corresponding emission wavelengths causing colour formation only in the colourless colour forming layer of the addressed infrared dye.

Suitable examples of infrared dyes include, but are not limited to, polymethyl indoliums, metal complex IR dyes, indocyanine green, polymethine dyes, croconium dyes, cyanine dyes, merocyanine dyes, squarylium dyes, chalcogenopyryloarylidene dyes, metal thiolate complex dyes, bis (chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, (metalized) azomethine dyes and combinations thereof.

Suitable inorganic infrared pigments include ferric oxide, carbon black and the like.

A preferred infrared dye is 5-[2,5-bis[2-[1-(1-methylbutyl)benz[cd]indol-2(1H)-ylidene]ethylidene]cyclopentylidene]-1-butyl-3-(2-methoxy-1-methylethyl)-2,4,6(1H,3H,5H)-pyrimidinetrione (CASRN 223717-84-8) represented by the Formula IR-1:

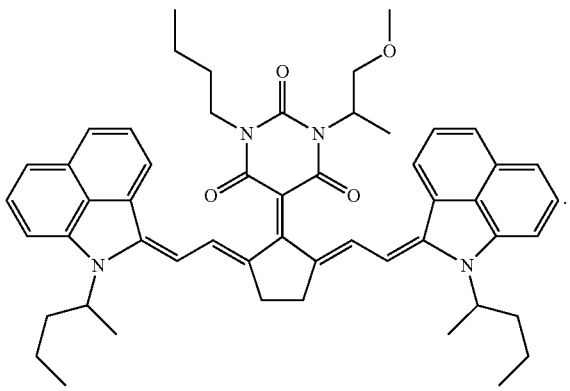

The infrared dye IR-1 has an absorption maximum $\lambda_{max}$ of 1052 nm making it very suitable for a Nd-YAG laser having an emission wavelength of 1064 nm.

The infrared red absorber is preferably present in the colourless colour forming layer in an amount of 0.05 to 1.0 g/m$^2$, more preferably in an amount of 0.1 to 0.5 g/m$^2$.

Thermal Acid Generating Compounds

The fragmentation of a colourless dye-precursor in the colourless colour forming layer of the security document precursor may be catalyzed or amplified by acids and acid generating agents.

Suitable thermal acid generating agents may be the polymeric acid generating agents based the ethylenically unsaturated polymerizable compounds A-(1) to A-(52) disclosed by U.S. Pat. No. 6,100,009 (FUJI) and herein incorporated as a specific reference.

Suitable non-polymeric acid generating agents are the compounds A-(1) to A-(52) disclosed by U.S. Pat. No. 6,100,009 (FUJI) lacking the ethylenically unsaturated polymerizable group.

The thermal acid generating agent is preferably present in the amount of 10 to 20 wt %, more preferably 14 to 16 wt % based on the total dry weight of the colourless colour forming layer.

Polymeric Binders

The polymeric binder of the at least one colourless colour forming layer in the security document precursor according to the present invention is a copolymer including at least 90 wt % of a chlorinated ethylene and 1 wt % to 10 wt % of vinyl acetate both based on the total weight of the binder.

In a preferred embodiment, the polymeric binder includes vinyl chloride as the chlorinated ethylene.

In a more preferred embodiment, the chlorinated ethylene in the polymeric binder consists of vinyl chloride.

The polymeric binder of the security document precursor according to the present invention preferably includes at least 90 wt % of vinyl chloride, more preferably at least 93 wt % of vinyl chloride.

The polymeric binder of the security document precursor according to the present invention preferably includes at least 4 wt % of vinyl acetate, more preferably at least 90 wt % of vinyl chloride and at least 4 wt % of vinyl acetate, because this results in lower minimum optical densities.

In a preferred embodiment, the polymeric binder consists of at least 90 wt % of a chlorinated ethylene and 1 wt % to 10 wt %, preferably 4 wt % to 8 wt % of vinyl acetate both based on the total weight of the binder.

The polymeric binder is preferably present in the colourless colour forming layer in an amount of 5 to 30 g/m², more preferably in an amount of 7 to 20 g/m².

In the most preferred embodiment, the colourless colour forming layer in the method of colour laser marking an security document precursor according to the present invention includes 4,4'-Bis(tert-butoxycarbonyloxy)diphenylsulfone as hydrogen donor-precursor and crystal violet lactone as the colour forming colourless dye-precursor and a copolymer including at least 90 wt % of a vinyl chloride and 1 wt % to 10 wt % of vinyl acetate both based on the total weight of the binder.

Transparent Biaxially Stretched Polyester Foils

In the present invention, the colourless colour forming layer containing an infrared absorber, a polymeric binder and a colour forming compound is coated on a biaxially stretched polyester foil, preferably on a biaxially stretched polyethylene terephthalate foil, both optionally provided with a subbing layer.

The transparency of the biaxially stretched polyester foil is required so that the infrared laser light can reach the colourless colour forming layer and that information and graphical data, e.g. security print and guilloches, can be observed in and underneath the laser marked colourless colour forming layer(s).

An advantage of using a biaxially stretched polyethylene terephthalate foil as the transparent polyester foil is that is very durable and resistant to mechanical influences (flexion, torsion, scratches), chemical substances, moisture and temperature ranges. This is especially useful for security documents such as identification cards and credit cards for which the average daily usage has lately augmented substantially from less than 1 time per week to 4 times per day. The card body has to withstand not only this increased usage, but also the associated storage conditions. Cards are no longer safely tucked away in cabinets at home or seldom-opened wallets, but are now loosely put away in pockets, purses, sport bags etc.—ready for immediate use. PVC (polyvinylchloride) is the most widely used material for plastic cards but has low durability of the card body, resulting in an effective lifetime of only 1-3 years, much lower than the lifetime of the often expensive chips included in the card. Other materials like Teslin™ and ABS are only suitable for very low-end or single-use cards. PC (polycarbonate) can be used for longer-life and more secure ID cards, but has a high production cost and a low resistance to torsion, scratching and chemicals.

The biaxially stretched polyester foil (e.g. PET-C foil) should be sufficiently thick to be self-supporting, but thin enough so that it is possible to include other layers, foils and support within the format as specified for security documents, e.g. by ISO 7810 for identity cards. The thickness of the PET-C foil is preferably between 10 µm and 200 µm, more preferably between 10 µm and 100 µm, most preferably 30 µm and 65 µm.

The transparent biaxially stretched polyester foil (e.g. PET-C foil) with the at least one colourless colour forming layer may be laminated onto a polymeric support, e.g. a lasermarkable polymeric support or a support coated with a lasermarkable layer for generating a black colour, forming a security document wherein the colourless colour forming layer is sandwiched between the transparent biaxially stretched polyester foil and the support. Additional foils and layers, e.g. other colourless colour forming layers having different infrared absorbers and colour forming compounds, may be included between the polymeric support and the transparent biaxially stretched polyester foil. In the case of a fully coloured security document, at least three colourless colour forming layers are present between the transparent biaxially stretched polyester foil and the support for forming e.g. the CMYK colours.

In a preferred embodiment, the security document is symmetrical, i.e. the same layers and foils are present on both sides of the support. This has the advantages that both sides can be colour laser marked and that possible curl due to an asymmetric construction of the security document is effectively prevented.

In order to comply with the format as specified by ISO 7810 for security documents, the transparent biaxially stretched polyester or PET-C foil and the support have a thickness of between about 6 µm and about 250 µm, more preferably between about 10 µm and about 150 µm, most preferably between about 20 µm and about 100 µm.

Polymeric Supports

The polymeric support can be transparent, translucent or opaque, but is preferably an opaque support. The advantage of an opaque support, preferably of a white colour, is that any information on the security document is more easily readable and that a colour image is more appealing by having a white background.

The polymeric support is preferably a single component extrudate, but may also be co-extrudate. Examples of suitable co-extrudates are PET/PETG and PET/PC.

Polymeric supports include cellulose acetate propionate or cellulose acetate butyrate, polyesters such as polyethylene terephthalate and polyethylene naphthalate, polyamides, polycarbonates, polyimides, polyolefins, poly(vinylacetals), polyvinylchlorides, polyethers and polysulphonamides.

Also synthetic paper can be used as a polymeric support, for example, Synaps™ synthetic paper of Agfa-Gevaert NV.

Other examples of useful high-quality polymeric supports for the present invention include opaque white polyesters and extrusion blends of polyethylene terephthalate and polypropylene. Also Teslin™ may be used as support.

Polyester supports and especially polyethylene terephthalate supports are preferred because of their excellent properties of dimensional stability. When such a polyester is used as the support material, a subbing layer may be employed to improve the bonding of layers, foils and/or laminates to the support.

In a preferred embodiment of the security document precursor according to the present invention, the support is polyvinyl chloride, polycarbonate or polyester, with coloured or whitened polyvinyl chloride, polycarbonate or polyester being preferred. The polyester support is preferably polyethylene terephthalate support (PET) or polyethylene terephthalate glycol (PETG).

Instead of a coloured or whitened support, an opacifying layer can be coated onto the support. Such opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In the present invention the rutile type is preferred because it has a very high refractive index, exhibiting a high covering power.

In one embodiment of the security document precursor according to the present invention, the support is an opacified polyvinyl chloride, an opacified polycarbonate or an opacified polyester.

The manufacturing of biaxially stretched polyester foils and supports is well-known in the art of preparing suitable supports for silver halide photographic films. For example, GB 811066 (ICI) teaches a process to produce biaxially oriented films of polyethylene terephthalate.

The polyethylene terephthalate foils and supports are preferably biaxially stretched with a stretching factor of at least 2.0, more preferably at least 3.0 and most preferably a stretching factor of about 3.5. The temperature used during stretching is preferably about 160° C.

Methods to obtain opaque polyethylene terephthalate substrates and biaxially oriented films thereof of have been disclosed in, e.g. US 2008238086 (AGFA).

Subbing Layers

The polyester foil and polymeric support may be provided with one or more subbing layers. This has the advantage that the adhesion between a layer, such as the colourless colour forming layer, and the polyester foil or polymeric support is improved. The transparent polyester foil preferably includes a subbing layer whereon the colourless colour forming layer is coated.

Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

The application of subbing layers is well-known in the art of manufacturing polyester supports for silver halide photographic films. For example, the preparation of such subbing layers is disclosed in U.S. Pat. No. 3,649,336 (AGFA) and GB 1441591 (AGFA);

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g. 90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment, the subbing layer has a dry thickness of no more than 2 μm or preferably no more than 200 mg/m².

Organic Solvents

For coating the colourless colour forming layer, one or more organic solvents may be used. The use of an organic solvent facilitates the dissolution of the polymeric binder and specific ingredients such as the infrared dye.

A preferred organic solvent is methylethylketone (MEK) because it combines a high solubilizing power for a wide range of ingredients and it provides, on coating the colourless colour forming layer, a good compromise between the fast drying of the colourless colour forming layer(s) and the danger of fire or explosion thereby allowing high coating speeds.

Other Security Features

To prevent forgeries of identification documents, different means of securing are used. One solution consists in superimposing lines or guilloches on an identification picture such as a photograph. In that way, if any material is printed subsequently, the guilloches appear in white on added black background. Other solutions consist in adding security elements such as information printed with ink that reacts to ultraviolet radiation, micro-letters concealed in an image or text etc.

The security document according to the present invention may contain other security features such as anti-copy patterns, guilloches, endless text, miniprint, microprint, nanoprint, rainbow colouring, 1D-barcode, 2D-barcode, coloured fibres, fluorescent fibres and planchettes, fluorescent pigments, OVD and DOVID (such as holograms, 2D and 3D holograms, Kinegrams™, overprint, relief embossing, perforations, metallic pigments, magnetic material, Metamora colours, microchips, RFID chips, images made with OVI (Optically Variable Ink) such as iridescent and photochromic ink, images made with thermochromic ink, phosphorescent pigments and dyes, watermarks including duotone and multitone watermarks, ghost images and security threads.

A combination of the security document according to the present invention with one of the above security features increases the difficulty for falsifying the document.

EXAMPLES

Materials

All materials used in the following examples were readily available from standard sources such as ALDRICH CHEMICAL Co. (Belgium) and ACROS (Belgium) unless otherwise specified. The water used was deionized water.

CCE is Bayhydrol H 2558, a anionic polyester urethane (37.3%) from BAYER.

Resorcinol from Sumitomo Chemicals.

Par is a dimethyltrimethylolamine formaldehyde resin from Cytec industries.

PAR-sol is a 40 wt % aqueous solution of Par.

PEA is Tospearl 120 from Momentive Performance materials.

PEA-sol is a 10 wt % (50/50) aqueous/ethanol dispersion of PEA.

Dowfax™ 2A1 from Pilot Chemicals C is a Alkyldiphenyloxide disulfonate (4.5% wt %).

DOW-sol is a 2.5 wt % solution of Dowfax™ 2A1 in isopropanol.

Surfynol™ 420 from Air Products is a non ionic surfactant.

Surfynsol is a 2.5 wt % solution of Surfynol™ 420 in iso propanol.

MEK is an abbreviation used for methylethylketone.

UCAR is an abbreviation for a 25 wt % solution in MEK of UCAR™ VAGD.

Baysilon is a 1 wt % solution in MEK of the silicon oil Baysilon™ Lackadditive MA available from BAYER.

HDP is the hydrogen donor-precursor CASRN 129104-70-7 prepared according to the synthesis given on page 31 of EP 605149 A (JUJO PAPER) for the compound (19).

CVL is crystal violet lactone is CASRN 1552-42-7 available from Pharmorgana:

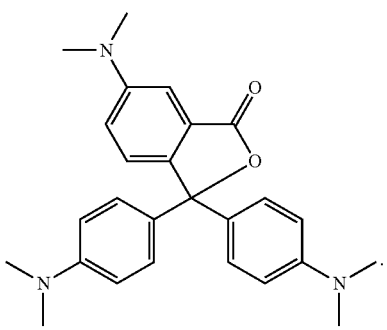

CVL

S-Lec™ BL5 HP Z is a polyvinyl acetal polymer prepared by acetalisation of a copolymer of vinylalcohol and vinyl acetate with butyraldehyde, manufactured by Sekisui, Japan.

Elvacite™ 2010 is a polymethyl methacrylate grade available from Lucite International, USA.

CAB 381-2 is a cellulose acetate butyrate grade manufactured by Eastman Chemical and provided by Barentz.

Vinnol™ E15/48A is a hydroxyl-containing copolymer of 84 wt % vinyl chloride and 16 wt % of acrylic acid esters (2-hydroxypropyl acrylate) provided by Wacker AG.

UCAR™ VAGC is a medium molecular weight, hydroxyl-functional terpolymer comprised of 81% vinyl chloride, 4% vinyl acetate, and 15% of a hydroxyalkyl acrylate (2-hydroxypropyl acrylate) provided by Dow Chemical.

Vinnol™ H40/43 is a copolymer of 66 wt % vinyl chloride and 34 wt % of vinyl acetate provided by Wacker AG.

Vinnol™ H40/60 is a copolymer of 61 wt % vinyl chloride and 39 wt % of vinyl acetate provided by Wacker AG.

Solvin™ 250SB is a copolymer of vinyl chloride and vinyl acetate provided by Solvin SA, Belgium.

Ixan™ SGA1 is a copolymer of 46% vinylidene chloride, 46% vinyl chloride, 3% maleic anhydride and 1% acrylonitrile provided by Solvin SA, Belgium.

Vinnol™ H11-59 is a copolymer of 89 wt % vinyl chloride and 11 wt % of vinyl acetate provided by Wacker AG.

Vinnol™ H14/36 is a copolymer of 86 wt % vinyl chloride and 14 wt % vinyl acetate provided by Wacker AG.

Ucar™ VYHH is a high molecular weight copolymer of 86% vinyl chloride and 14% vinyl acetate provided by Dow Chemical.

Vinnol™ H15/50 is a copolymer of 85 wt % vinyl chloride and 15 wt % of vinyl acetate provided by Wacker AG.

Solbin™ MFK is a copolymer of 90% vinyl chloride, 7% vinyl acetate and 3% acrylic acid, provided by Nissin Chemical industry Co., Japan.

Solbin™ M5 is a copolymer of 85% vinyl chloride, 14% vinyl acetate and 1% of a dicarboxylic acid, provided by Nissin Chemical industry Co., Japan.

UCAR™ VAGD is a medium molecular weight copolymer of 90% vinyl chloride, 4% vinyl acetate and 6% vinylalcohol, provided by Dow Chemical.

Solbin™ AL is a copolymer of 93% vinyl chloride, 2% vinyl acetate and 5% vinylalcohol provided by Nissin Chemical industry Co., Japan.

Solbin™ A is a copolymer of 92% vinyl chloride, 3% vinyl acetate and 5% vinylalcohol provided by Nissin Chemical industry Co., Japan.

Solvin™ 561SF is a vinylchloride-vinylacetate copolymer with 6% vinyl acetate, provided by Solvin SA, Belgium.

DMF is dimethylformamide.
DMA is dimethylacetamide.
THF is tetrahydrofuran.

IR-1 is a 0.15 wt % solution in MEK of the infrared dye CASRN 223717-84-8 and was prepared as described below.

The synthesis of intermediate INT-5 was carried out in a cascade mode without purification of the intermediates INT-1, INT-2, INT-3 and INT-4 as described below:

Intermediate INT-1

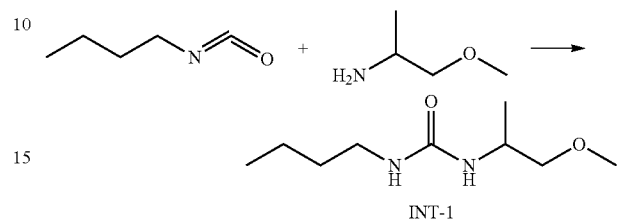

To a solution of butyl isocyanate (1.03 eq.) in toluene (70 mL/mol) at 50° C. was added 2-amino-1-methoxy propane (1.00 eq.) over a 2 hour period. After stirring for 30 minutes, excess toluene and reagent were distilled off at 85° C./50 mbar and at 85° C./20 mbar respectively. The mixture was allowed to reach atmospheric pressure under nitrogen.

Intermediate INT-2

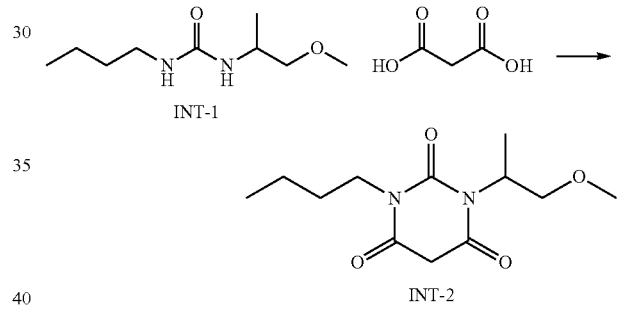

To the warm residue (INT-1) were consecutively added: acetic acid (140 mL/mol), malonic acid (1.00 eq.) and acetic anhydride (2.00 eq.). Under stirring the reaction mixture was gently warmed to 90° C. After stirring for 2.5 hours at 90° C., methanol (70 mL/mol) was added and the mixture was refluxed for 45 minutes. Subsequently, the solvents were removed at 100° C./70 mbar. After cooling to 30° C., methyl t. butyl ether (MTBE) (300 mL/mol) was added. This mixture was extracted 3× with a 5% NaCl solution in water and 2× with a saturated NaCl solution in water. The MTBE was distilled off at 95° C./70 mbar. The remaining water was azeotropically removed with toluene. The mixture was allowed to reach room temperature under nitrogen at atmospheric pressure.

Intermediate INT-3

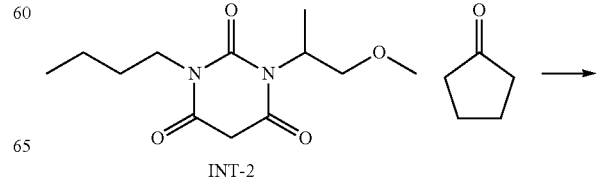

Intermediate INT-5

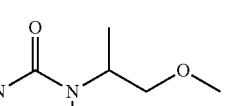

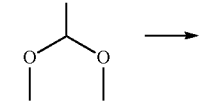

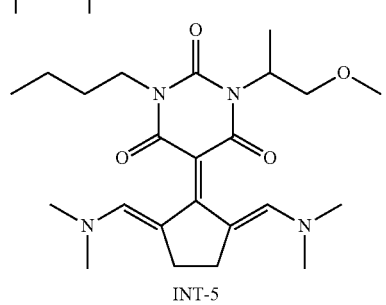

To the residue (INT-2) were consecutively added under a nitrogen blanket at room temperature: cyclopentanone (1.10 eq.), ammoniumacetate (0.07 eq.) and methanol (150 mL/mol). After refluxing for 4.5 hours, methanol was distilled off at 50 mbar. Remaining methanol and water were azeotropically removed with toluene. After cooling to room temperature, toluene (0.108 kg/mol) was added. This solution was filtered on a stainless steel filter covered with silica (30 g/mol). The reactor and the filter cake were washed with toluene (4×50 mL/mol). This solution of INT-3 was directly used in the next step Intermediate INT-4

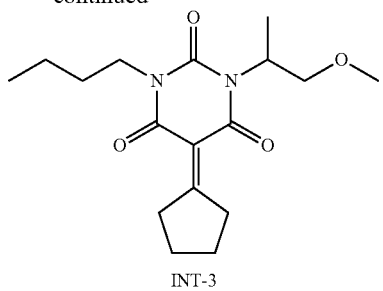

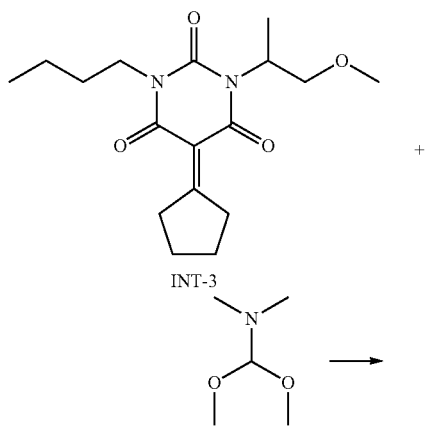

To the toluene solution of INT-3 at room temperature was added acetic acid (1.00 eq.). Under a nitrogen blanket, DMF-DMA (1.13 eq.) was quickly (10 minutes) added at 10° C. After 5 minutes, n. hexane (830 mL/mol) was added, followed by another portion of n. hexane (415 mL/mol) after 30 minutes. After stirring for at least 1 hour (crystallisation) INT-4 is collected by filtration. After washing with n. hexane/toluene (100 mL/mol) and n. hexane (3×125 mL/mol), the product INT-4 was digested with n. hexane (500 mL/mol), filtered and dried at 25° C. for 24 hours.

To a suspension of INT-4 in ethyl acetate (320 mL/mol) under nitrogen at room temperature was added DMF-DMA (3.49 eq.) in one portion. The mixture was heated to 65° C. and stirred at 65° C. for 25 minutes. While quickly cooling to 15° C., a mixture of MTBE (640 mL/mol) and n. hexane (160 mL/mol) was added. After stirring for 15 minutes, the product was filtered and consecutively washed with ethylacetate/MTBE 80/20 (200 mL/mol), ethylacetate/n. hexane 80/20 (200 mL/mol), ethylacetate/n. hexane 50/50 (200 mL/mol) and n. hexane (200 mL/mol). The rather unstable product (INT-5) was dried at 25° C. for 24 hours.

The synthesis of intermediate INT-7 was carried out in a cascade mode without purification of the intermediate INT-6 as described below:

Intermediate INT-6

To a nitrogen blanketed solution of 1,8-Naphtholactam (1.00 eq.) in sulfolane (250 mL/mol) at 70° C. were added potassium iodide (0.20 eq.) and dimethylaminopyridine (DMAP) (0.135 eq.).

To this mixture was added potassium hydroxide (KOH) (0.60 eq.) and 2-bromo pentane (0.50 eq.).

After 1 hour at 70-75° C. another portion of KOH (0.60 eq.) and 2-bromo pentane (0.50 eq.) were added, while distilling of the pentene side product. This was repeated 2 times. After cooling the reaction mixture was diluted with MTBE (1 L/mol) and washed with water. The water layer was extracted again with MTBE. The combined extracts were washed consecutively with a 15% NaCl solution in water, a 10% NaCl solution in water containing 4% HCl, a 15% NaCl solution in water containing 1% NaHCO3 and a 25% NaCl solution in water. The MTBE was distilled off and the remaining water was azeotropically removed with toluene. The crude INT-6 (oil) was used a such.

Intermediate INT-7

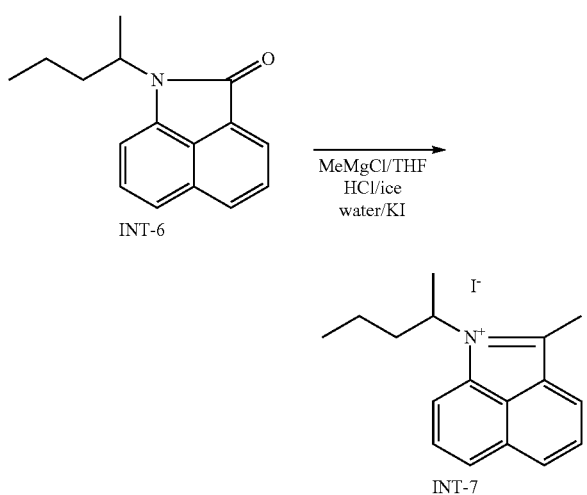

To nitrogen blanketed solution of INT-6 (1.00 eq.) in THF (100 mL/mol) at room temperature was added methyl magnesiumchloride (1.28 eq.) over 45 minutes (55-60° C.). After stirring for 1 hour at 55° C., the reaction mixture was added to a mixture of HCl (3.9 eq.) in ice water (3.66 kg/mol). After distillative removal of the THF, the aqueous solution was filtered and added to a solution of KI (2.00 eq.) in water (2.1 L/mol). After crystallisation, crude INT-7 was filtered and consecutively washed with water (2.55 L/mol) and ethyl acetate (2.55 L/mol) and dried at 40° C.

Yield: 76%

IR-absorber IR-1

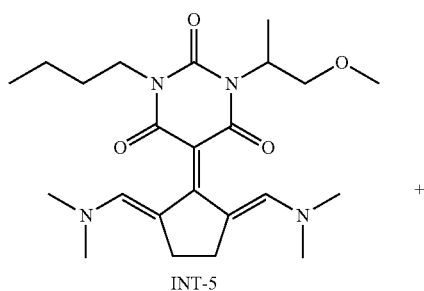

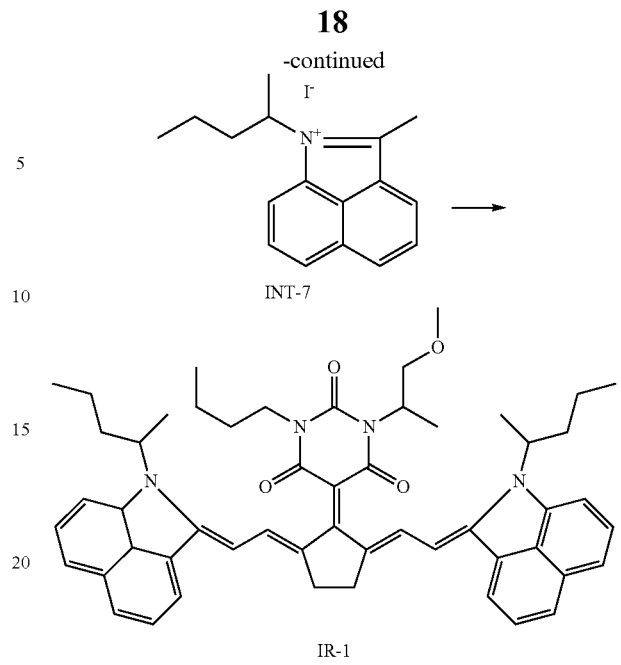

To a stirred suspension of INT-5 (1.00 eq.) in methyl acetate (4 L/mol) at 50° C., was added in portions INT-7 (2.10 eq.) over 5 minutes. After stirring for 1 hour at 55° C., 2 extra portions of INT-7 (each 0.016 eq.) were added. After stirring for 2.5 hours at 55° C., the reaction mixture was cooled to room temperature. Crude IR-1 was isolated by filtration and washed with ethyl acetate (4 L/mol).

After digestion in water (to remove salts) (4 L/mol), filtering and washing on the filter with water (2 L/mol) and MTBE (1.5 L/mol) the product was dried at 40° C. Yield=92%.

Measurement Methods

1. Optical Density

The optical density was measured in reflection using a spectrodensitometer Type Macbeth TR924 using a visual filter.

2. Adhesion

The adhesion was evaluated according to the method described in ISO10373-1:1998-5.3 Peel strength The conditions used were:

Relative humidity 50% at 23° C.

Measurement cell 500 N

Speed of 300 mm/min

Width of 10 mm

The norm laid down in ISO 10373-1 is ≥3.5 N/cm. In this application, the adhesion is considered excellent ("OK") if the peel strength had a value of ≥6 N/cm, in the alternative case the adhesion is considered to be insufficient ("NOK").

Example 1

This example illustrates that a good image quality colour formation and adhesion can be obtained with a security document precursor containing a polymeric binder in accordance with present invention.

Preparation of PET-C Foil PET1

A coating composition SUB-1 was prepared by mixing the components according to Table 1 using a dissolver.

TABLE 1

| Components of SUB-1 | wt % |
| --- | --- |
| deionized water | 76.66 |
| CCE | 18.45 |
| resorcinol | 0.98 |
| PAR-sol | 0.57 |
| PEA-sol | 0.68 |
| DOW-sol | 1.33 |
| Surfynsol | 1.33 |

A 1100 µm thick polyethylene terephthalate sheet was first longitudinally stretched and then coated with the coating composition SUB-1 to a wet thickness of 10 µm. After drying, the longitudinally stretched and coated polyethylene terephthalate sheet was transversally stretched to produce a 63 µm thick sheet PET1, which was transparent and glossy.

Preparation of Colourless Colour Forming Layer

The coating compositions COL-1 to COL-19 were all prepared in the same way by mixing the components according to Table 2 using a dissolver but using the polymer POL as given by Table 3.

TABLE 2

| Components of COL-1 | wt % |
| --- | --- |
| Baysilon | 1.20 |
| MEK | 6.71 |
| Polymer POL | 56.96 |
| IR-1 | 29.20 |
| HDP | 3.08 |
| CVL | 2.85 |

TABLE 3

| Coating composition | Polymer POL |
| --- | --- |
| COL-1 | S-Lec ™ BL5 HP Z |
| COL-2 | Elvacite ™ 2010 |
| COL-3 | CAB 381-2 |
| COL-4 | Vinnol ™ E15/48A |
| COL-5 | UCAR ™ VAGC |
| COL-6 | Vinnol ™ H40/43 |
| COL-7 | Vinnol ™ H40/60 |
| COL-8 | Solvin ™ 250SB |
| COL-9 | Ixan ™ SGA1 |
| COL-10 | Vinnol ™ H11-59 |
| COL-11 | Vinnol ™ H14/36 |
| COL-12 | Ucar ™ VYHH |
| COL-13 | Vinnol ™ H15/50 |
| COL-14 | Solbin ™ MFK |
| COL-15 | Solbin ™ M5 |
| COL-16 | UCAR ™ VAGD |
| COL-17 | Solbin ™ AL |
| COL-18 | Solbin ™ A |
| COL-19 | Solvin ™ 561SF |

Each coating composition COL-1 to COL-19 was coated with an Elcometer Bird Film Applicator (from ELCOMETER INSTRUMENTS) on the subbed PET-C support PET1 at a coating thickness of 100 µm and subsequently dried for 2 minutes at 20° C. on the film applicator and for a further 15 minutes in an oven at 75° C. to deliver the security films SF-1 to SF-19.

Preparation of Security Document Precursors

The security films SF-1 to SF-19 were then laminated onto a 500 µm opaque PETG core from WOLFEN to deliver the security document precursors SDP-1 to SDP-19.

The lamination was performed using an Oasys OLA6/7 plate laminator with the settings: LPT=115° C., LP=40, Hold=210 sec, HPT=115° C., HP=40 and ECT=50° C.

Evaluation and Results

After lamination, a test image containing a wedge with different grey-levels (ten squares of 7×9 mm) was laser marked on the security document precursors SDP-1 to SDP-19 through the PET-C foil using a Rofin RSM Powerline E laser (10 W) with settings 33 ampere and 44 kHz.

The adhesion, the minimum optical density $D_{min}$ of the non-laser marked square and the maximum optical density were determined for all the samples. The value of $\Delta D$ is the difference between $D_{max}$ and $D_{min}$ is indicative for the number of grey levels that can be obtained. The higher $\Delta D$, the more grey levels and thus the better the image quality. A good image quality requires a $\Delta D$ of at least 0.75 and a Dmin of less than 0.50, preferably less than 0.35. The results are shown by Table 4.

TABLE 4

| Laser marked Sample | wt % Chlorinated ethylene | wt % Vinyl acetate | Adhesion | $D_{min}$ | $D_{max}$ | $\Delta D$ |
| --- | --- | --- | --- | --- | --- | --- |
| SDP-1 | 0 | 1.4 | NOK | 0.32 | 0.32 | 0.00 |
| SDP-2 | 0 | 0 | NOK | 0.22 | 0.22 | 0.00 |
| SDP-3 | 0 | 0 | NOK | 0.28 | 0.28 | 0.00 |
| SDP-4 | 84 | 0 | OK | 0.48 | 0.94 | 0.46 |
| SDP-5 | 80 | 20 | OK | 0.39 | 0.88 | 0.49 |
| SDP-6 | 66 | 34 | NOK | 0.25 | 0.62 | 0.37 |
| SDP-7 | 61 | 39 | NOK | 0.53 | 0.84 | 0.31 |
| SDP-8 | 100 | 0 | NOK | 0.25 | 1.18 | 0.93 |
| SDP-9 | 92 | 0 | OK | 0.53 | 1.08 | 0.55 |
| SDP-10 | 89 | 11 | NOK | 0.23 | 1.31 | 1.08 |
| SDP-11 | 86 | 14 | NOK | 0.25 | 0.78 | 0.53 |
| SDP-12 | 86 | 14 | NOK | 0.25 | 1.16 | 0.91 |
| SDP-13 | 85 | 15 | NOK | 0.25 | 1.08 | 0.83 |
| SDP-14 | 89 | 6.5 | OK | 0.54 | 1.31 | 0.77 |
| SDP-15 | 85 | 14 | NOK | 0.34 | 1.24 | 0.90 |
| SDP-16 | 90 | 4 | OK | 0.33 | 1.16 | 0.83 |
| SDP-17 | 93 | 2 | OK | 0.40 | 1.17 | 0.77 |
| SDP-18 | 92 | 3 | OK | 0.42 | 1.23 | 0.81 |
| SDP-19 | 93 | 7 | OK | 0.24 | 1.14 | 0.90 |

From Table 4, it should be clear that only the security document precursors SDP-16 to SDP-19 containing a polymeric binder in accordance with the invention exhibit good image quality and adhesion.

The invention claimed is:

1. A security document precursor including, in order:
   a) at least one transparent biaxially stretched polyester foil;
   b) at least one colourless colour forming layer containing at least an infrared absorber, a colourless dye-precursor and a polymeric binder; and
   c) a polymeric support;
   wherein the polymeric binder is a copolymer including at least 90 wt % of a chlorinated ethylene and 1 wt % to 10 wt % of vinyl acetate both based on the total weight of the binder.

2. The security document precursor according to claim 1 wherein the chlorinated ethylene includes vinyl chloride.

3. The security document precursor according to claim 2 wherein the polymeric binder includes at least 90 wt % of vinyl chloride.

4. The security document precursor according to claim 3 wherein the polymeric binder includes at least 4 wt % of vinyl acetate.

5. The security document precursor according to claim 2 wherein the polymeric binder includes at least 4 wt % of vinyl acetate.

6. The security document precursor according to claim 1 wherein the infrared absorber is an infrared dye.

7. The security document precursor according to claim 1 wherein the colourless dye-precursor is a colourless leuco dye.

8. The security document precursor according claim 7 further including a hydrogen donor precursor.

9. The security document according to claim 8 containing 4,4'-Bis(tert-butoxycarbonyloxy)diphenylsulfone as hydrogen donor precursor and crystal violet lactone as colourless leuco dye.

10. The security document precursor according to claim 1 containing electronic circuitry.

11. The security document precursor according to claim 1 wherein the transparent biaxially stretched polyester foil is a transparent biaxially stretched polyethylene terephthalate foil.

12. A security document obtained by laser marking the security document precursor according to claim 1.

13. The security document according to claim 12, which is selected from the group consisting of a passport, a personal identification card, and a product identification document.

14. The security document according to claim 13 wherein the product identification document is attached to the packaging material of the product or to the product itself.

15. A method for making a security document precursor by coating on a transparent biaxially stretched polyester foil at least one colourless colour forming layer containing at least an infrared absorber, a colourless dye-precursor, and a polymeric binder; wherein the polymeric binder is copolymer including at least 90 wt % of a chlorinated ethylene and 1 wt % to 10 wt % of vinyl acetate both based on the total weight of the binder.

16. The method according to claim 15 wherein the polymeric binder includes at least 90 wt % of vinyl chloride.

* * * * *